United States Patent
Bonhomme

(10) Patent No.: US 7,065,375 B2
(45) Date of Patent: Jun. 20, 2006

(54) PROCESS AND DEVICE FOR ESTIMATING THE SPEED OF MOVEMENT OF A MOBILE TERMINAL, IN PARTICULAR A CELLULAR MOBILE TELEPHONE CAPABLE OF OPERATING ACCORDING TO THE UMTS STANDARD

(75) Inventor: Corinne Bonhomme, Sergy (FR)

(73) Assignee: STMicroelectronics N.V., Amsterdam (NL)

( * ) Notice: Subject to any disclaimer, the term of this patent is extended or adjusted under 35 U.S.C. 154(b) by 426 days.

(21) Appl. No.: 10/254,028

(22) Filed: Sep. 24, 2002

(65) Prior Publication Data
US 2003/0060164 A1 Mar. 27, 2003

(30) Foreign Application Priority Data
Sep. 25, 2001 (EP) ................... 01122581

(51) Int. Cl.
*H04B 1/12* (2006.01)
(52) U.S. Cl. ........... 455/506; 455/63.1; 455/67.11; 375/343
(58) Field of Classification Search .......... 455/504, 455/506, 238.1, 67.11, 441, 303, 334, 456.1, 455/63.1; 375/224, 343
See application file for complete search history.

(56) References Cited
U.S. PATENT DOCUMENTS
6,370,357 B1 * 4/2002 Xiao et al. ............ 455/67.11
6,563,861 B1 * 5/2003 Krasny et al. ............ 375/150
6,680,967 B1 * 1/2004 Westman ................ 375/148
6,680,969 B1 * 1/2004 Molnar et al. ............ 375/224
2004/0132443 A1 * 7/2004 Klein et al. ............... 455/424

FOREIGN PATENT DOCUMENTS
EP 1014107 6/2000
WO 98/59515 12/1998

* cited by examiner

*Primary Examiner*—Edward F. Urban
*Assistant Examiner*—Blaine Jackson
(74) *Attorney, Agent, or Firm*—Lisa K. Jorgenson; Allen, Dyer, Doppelt, Milbrath & Gilchrist, P.A.

(57) ABSTRACT

A process for estimating a speed of movement of a mobile terminal operating in a wireless communication system and communicating with a base station via a transmission channel includes estimating fading of the transmission channel, and performing an autocorrelation on the fading for providing a first autocorrelation result. Reference autocorrelation results are calculated for predetermined values of speed of movement of the mobile terminal, with the calculating being based upon a known autocorrelation function performed on the fading. The process further includes comparing the first autocorrelation result to the various reference autocorrelation results, and estimating the speed of movement of the mobile terminal based upon the comparison.

23 Claims, 3 Drawing Sheets

PROCESS AND DEVICE FOR ESTIMATING THE SPEED OF MOVEMENT OF A MOBILE TERMINAL, IN PARTICULAR A CELLULAR MOBILE TELEPHONE CAPABLE OF OPERATING ACCORDING TO THE UMTS STANDARD

FIELD OF THE INVENTION

The present invention relates in general to wireless communication systems, and in particular, to a wireless communication system operating in accordance with the Universal Mobile Telecommunications System (UMTS) standard.

BACKGROUND OF THE INVENTION

In a wireless communication system, a base station communicates with a plurality of remote terminals, such as cellular mobile telephones. Frequency division multiple access (FDMA) and time division multiple access (TDMA) are the traditional multiple access schemes for delivering simultaneous services to a number of terminals. The basic idea underlying the FDMA and TDMA systems includes sharing the available resources so that several terminals can operate simultaneously without causing interference. The available resources that may be shared include frequencies and time intervals.

Telephones operating according to the GSM standard belong to the FDMA and TDMA systems in the sense that transmission and reception are performed at different frequencies and also at different time intervals. In contrast to the systems using frequency division or time division, the CDMA (Code Division Multiple Access) systems allow multiple users to share a common frequency and a common time channel by using coded modulation. Included among the CDMA systems are the CDMA 2000 system, the WCDMA system (Wide Band CDMA) and the IS-95 standard.

In CDMA systems, as is well known to the person skilled in the art, a scrambling code is associated with each base station and makes it possible to distinguish one base station from another. Furthermore, an orthogonal code, known by the person skilled in the art as an OVSF code, is allotted to each remote terminal, such as a cellular mobile telephone, for example. All the OVSF codes are mutually orthogonal, thus making it possible to distinguish one remote terminal from another.

Before sending a signal over the transmission channel to a remote terminal, the signal has been scrambled and spread by the base station using the scrambling code of the base station and the OVSF code of the remote terminal. In CDMA systems, it is again possible to distinguish between those which use a distinct frequency for transmission and reception (CDMA-FDD system), and those which use a common frequency for transmission and reception but distinct time domains for transmission and reception (CDMA-TDD system).

SUMMARY OF THE INVENTION

The present invention applies advantageously to communication systems of the CDMA type. The present invention also applies to communication systems of the FDMA and TDMA type, and in particular, to GSM and GPRS telephones. More generally, the invention applies to terminals using coherent reception, and in particular, to those operating according to the UMTS standard which operate under both a CDMA system (e.g., the WCDMA system) and under an FDMA and TDMA system.

The invention relates more particularly to estimating the speed of movement of a mobile terminal, such as a cellular mobile telephone. As indicated above, each base station of the communication system radiates within a cell, and consequently communicates with all the telephones in this cell. When the user of a telephone moves and reaches the border of a cell, the base station can decide, depending on specific parameters measured by the telephone, to hand the telephone over to another base station.

Estimating the speed of movement of the mobile telephone is a parameter that may be taken into account by the base station for deciding whether to transfer the mobile telephone to another base station. Estimation of the speed may also be used to improve the monitoring of the reception power of the signal.

There are numerous approaches for estimating the speed of movement of a mobile terminal, and most of these approaches are based on the calculation of the autocorrelation of the signal. The main difficulty is to estimate the speed from the result of this autocorrelation.

The invention thus provides another approach to the problem of estimating the speed of movement of a mobile terminal. This process estimates the speed of movement of a mobile terminal by talking to a base station via a transmission channel.

According to a general characteristic of the invention, the process comprises a channel estimation for estimating the fading of the channel. An autocorrelation of the fading is then performed for obtaining a first autocorrelation result.

The process moreover comprises a predetermination for various predetermined values on the speed of movement of the mobile terminal, and for various reference autocorrelation results obtained using an autocorrelation function, assumed known, for the fading. For example, the Jake model which is well known to the person skilled in the art may be used, which comprises a Bessel function of the first type of order zero.

The first autocorrelation result and the various reference autocorrelation results are then compared, and the speed of movement of the mobile terminal is estimated as a function of the result of the comparison. Stated otherwise, one selects, for example, the reference autocorrelation result which is closest to the first autocorrelation result, and the speed of movement associated with this selected reference autocorrelation result is then the estimated speed of movement of the mobile terminal.

To calculate the autocorrelation of the fading, it is possible to calculate a normalized autocorrelation of a single fading coefficient, for example, that is associated with the path that exhibits the best signal-to-noise ratio. In this regard, the number of successive values of the coefficient which will be used to calculate the autocorrelation function conditions the minimum speed that one wishes to estimate. For example, an autocorrelation performed over 30 successive values makes it possible to obtain a minimum observable speed of around 10 km/h. This is generally sufficient for common applications.

The first autocorrelation result is then a vector of chosen length, and the various reference autocorrelation results are various vectors of the same length resulting from this coefficient's normalized autocorrelation obtained with the autocorrelation function that is assumed known.

As a variation, instead of using a normalized autocorrelation of a single fading coefficient, it is possible to combine the values of the various fading coefficients, and weighting them by the respective signal-to-noise ratios. This is based upon knowing that the speed is global for the multipath transmission channel, that is, it is the same regardless of the path.

The subject of the invention is also directed to a device for estimating the speed of movement of a mobile terminal talking to a base station via a transmission channel. According to a general characteristic of the invention, such a device comprises channel estimation means for performing a channel estimation for estimating the fading of the channel. First autocorrelation means perform an autocorrelation of the fading for obtaining a first autocorrelation result.

The device also comprises a memory for storing, for various predetermined values of speed of movement of the mobile terminal, various precalculated reference autocorrelation results obtained using an autocorrelation function, assumed known, of the fading. Comparison means perform a comparison between the first autocorrelation result and the various reference autocorrelation results. Speed estimation means perform an estimation of the speed of movement of the mobile terminal as a function of the result of the comparison.

The subject of the invention is also directed to a mobile terminal incorporating a speed estimation device as defined above. The mobile terminal may be a cellular mobile telephone.

BRIEF DESCRIPTION OF THE DRAWINGS

Other advantages and characteristics of the invention will become apparent on examining the detailed description of the modes of implementation and embodiments, which are in no way limiting, and the appended drawings, in which.

DETAILED DESCRIPTION OF THE PREFERRED EMBODIMENTS

Figure 1:
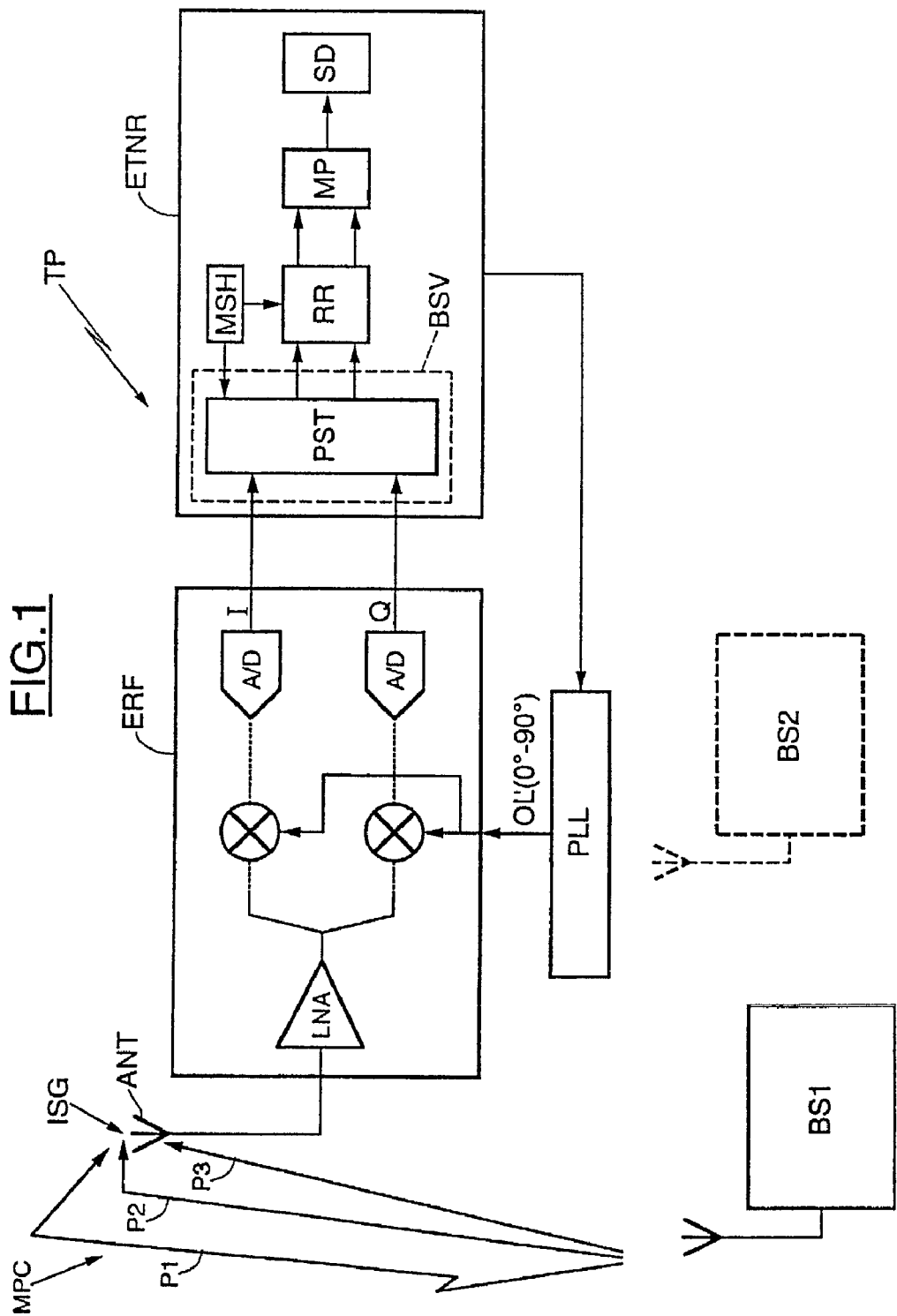
FIG. 1 diagrammatically illustrates a basic architecture of a cellular mobile telephone incorporating a speed estimation device according to the invention.

In FIG. 1, the reference TP designates a remote terminal, such as a cellular mobile telephone, which is in communication with a base station BS1 according to a communication scheme of the CDMA type, for example. The cellular mobile telephone comprises, in a conventional manner, a radio frequency analog stage ERF connected to an antenna ANT for receiving an input signal ISG.

Conventionally, the analog stage ERF comprises a low noise amplifier LNA and two processing pathways. Each pathway includes mixers, filters and conventional amplifiers which are not represented in FIG. 1 in order to simplify the drawing. The two mixers respectively receive from a phase-locked loop PLL two signals exhibiting a 90° mutual phase difference. After frequency transposition in the mixers, the two processing pathways respectively define two streams I (direct stream) and Q (quadrature stream) according to terminology well known to the person skilled in the art.

After digital conversion in a pair of analog/digital converters, the two streams I and Q are delivered to a reception processing stage ETNR. Because of the possible reflections of the initially transmitted signal off obstacles lying between the base station and the mobile telephone, the transmission medium is a multipath transmission medium MPC. That is, the transmission medium includes several different transmission routes. Three transmission routes P1, P2, P3 are represented in FIG. 1. Consequently, the signal ISG received by the mobile telephone TP comprises various temporally delayed versions of the signal initially transmitted. The different versions are the result of the multipath transmission characteristics of the transmission medium. Also, each path introduces a different delay.

The processing stage ETNR comprises a device PST for determining the fading coefficients of the paths of the multipath transmission channel. As will be seen in greater detail below, this device PST, which is a channel estimation device, forms part of a device BSV for estimating the speed of movement of the cellular mobile telephone TP. The various functions forming the device BSV may be implemented in software within a microprocessor, or at least a portion of the functions may be hard-wired within an integrated circuit.

Returning now to the characteristics of the transmission channel, the various time delays τ of the various paths of the multipath channel are estimated by a search unit MSH, and can be continuously tracked by a digital locked loop, for example. The structure of a search unit and a tracking unit are well known to the person skilled in the art. Briefly, correlation peaks occurring at different instants are obtained based upon the multi-path signals arriving at the search unit. The amplitude of a peak is proportional to the path's signal envelope, and the instant of each peak, relative to the first arrival, provides a measure of the delay of the corresponding path. The information on these delays, which also defines the number of fingers of the Rake receiver, is delivered by the unit MSH to the Rake receiver RR.

The Rake receiver RR, which is included in a cellular mobile telephone operating in a CDMA communication system, is used to carry out time alignment, descrambling, despreading and combining of the delayed versions of the initially transmitted signal in order to deliver the information streams contained in the initial signal. Of course, the received signal ISG could also result from the transmission of initial signals respectively transmitted by different base stations BS1 and BS2.

The Rake receiver RR is followed by conventional means MP of demodulation which demodulate the spectrum delivered by the Rake receiver RR. The processing stage ETNR also conventionally comprises a source decoder SD which performs a source decoding, which is well known to the person skilled in the art.

Also well known to the person skilled in the art, the phase-locked loop PLL is controlled by an automatic frequency control algorithm incorporated in a processor in the stage ETNR. Before transmission via the antenna from the base station BS1, the initial signal containing the information (symbols) is scrambled and spread by processing means associated with the base station. This is done using the scrambling code of the base station and the orthogonal code (OVSF code) of the cellular mobile telephone TP.

Consequently, the symbols are converted to chips having a predetermined length (for example, equal to 260 ns), and correspond to a predetermined chip rate equal to 3.84 Mcps, for example. Thus, the chip rate is greater than the symbol rate. A symbol can thus be transformed into a number of chips, such as 4 to 256, for example.

The information transmitted by the base station which is made up of chips is conveyed within successive frames TRR. Each frame TRR is subdivided into a predetermined number of slots SLi. As a guide, each frame TRR, having a length of 10 ms, is subdivided into 15 slots SL0–SL14. Each slot has a length equal to 2560 chips.

Figure 2:
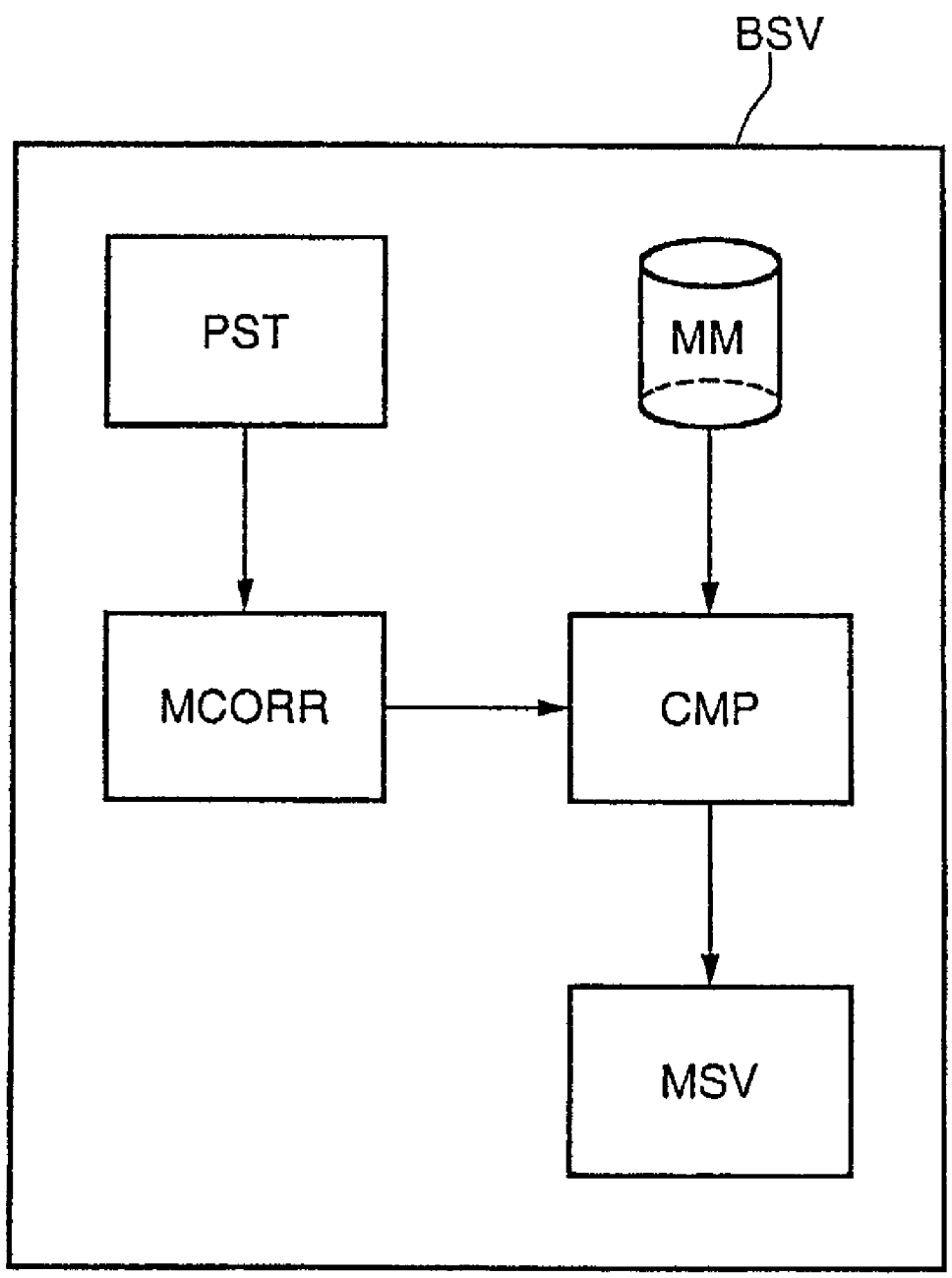
FIG. 2 illustrates in greater detail, but still diagrammatically, an internal architecture of the speed estimation device illustrated in FIG. 1.
Figure 3:
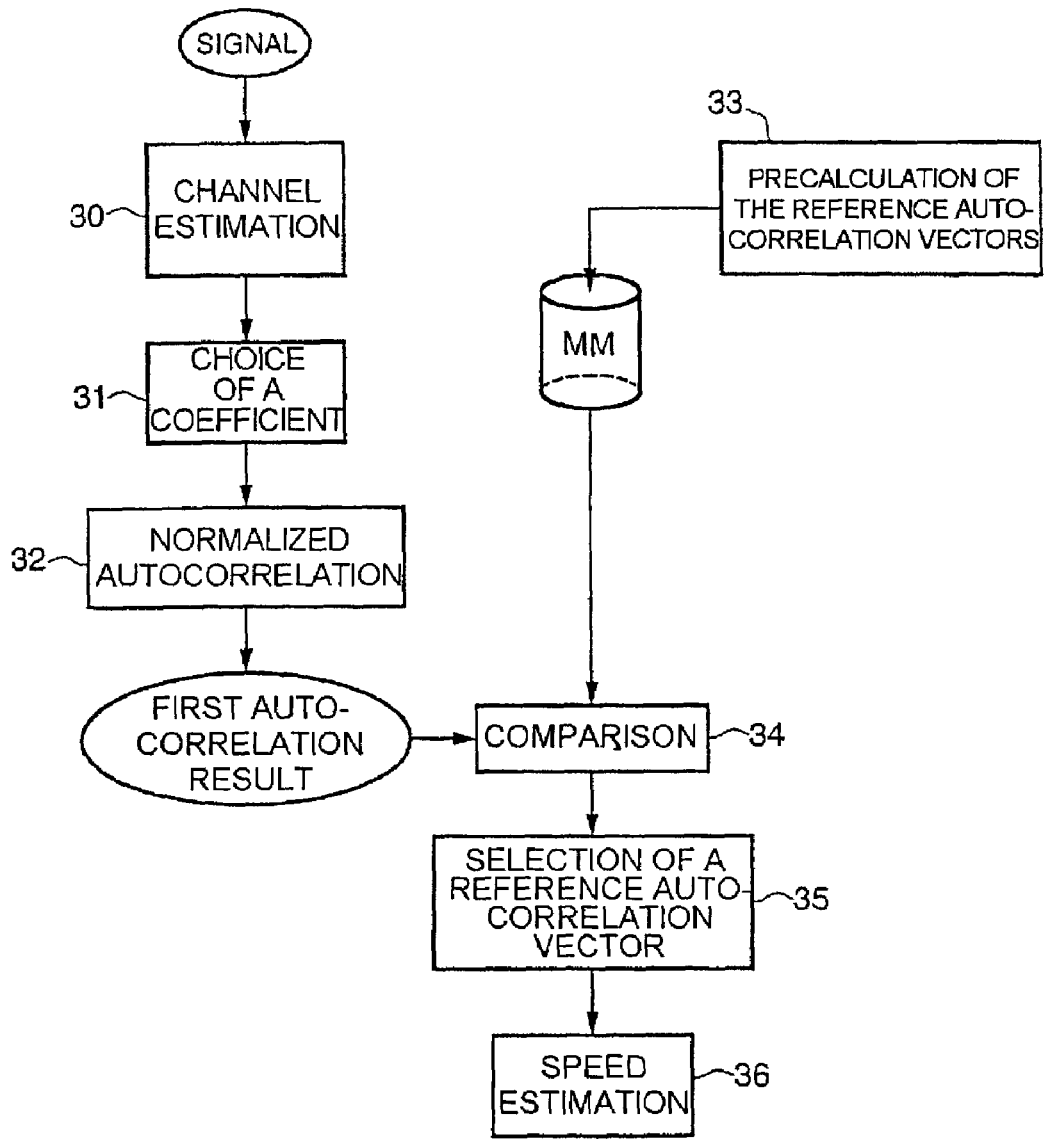
FIG. 3 is a flowchart for estimating a speed of movement of a mobile terminal according to the invention.

The architecture and the manner of operation of the speed estimation device BSV according to the invention will now be described in greater detail while referring to FIGS. 2 and 3. Within the framework of channel estimation, which is necessary for coherent reception, as is the case for the UMTS standard, the estimation means PST estimate at each slot and for each finger the phase and the amplitude of the fading. This estimation can be made by any well known channel sounding technique. Such as, for example, by a straightforward correlation of the signal received with the product of the spreading code and of the scrambling code (step 30, FIG. 3).

Stated otherwise, each finger of the Rake receiver (i.e., each path of the multipath channel) is associated with a fading coefficient. This coefficient is a complex coefficient which can vary over time. Also at each slot, the means PST deliver the current value of each fading coefficient. These values are then delivered to the Rake receiver RR and they will be used within the framework of the speed estimation according to the invention.

In this regard, the collecting of these fading coefficients sampled at the rate of one value per slot makes it possible to construct a first autocorrelation result. This is performed by first autocorrelation means MCORR.

More precisely, the result of the autocorrelation of a coefficient λ over a window of N successive values, for example, 30 corresponding to a duration of 20 ms, is a vector R of chosen length L and having L components. This vector R(k) with k varying from 0 to L−1 is defined by the following formula (1):

$$R(k) = \left(\sum_{n=0}^{N} \lambda_n \lambda_{n+k}^*\right) / R(0) \quad (1)$$

in which R(0) represents the modulus squared of the fading coefficient, and "*" designates the complex conjugate.

The use of such a normalized autocorrelation makes it possible to use just one of the fading coefficients determined by the means PST. In this regard, it will, for example, be possible to choose the one associated with the path which exhibits the highest signal-to-noise ratio (steps 31 and 32).

Moreover, the device BSV comprises a memory MM which stores a certain number of precalculated reference autocorrelation results obtained using a correlation function assumed known. In this regard, it is possible to use the Jake model, which is well known to the person skilled in the art, and which is the autocorrelation model generally adopted in an urban setting.

More precisely, in this case, the reference normalized autocorrelation vector associated with each fading coefficient of length L (k varying from 0 to L−1), is defined by the following formula (2):

$$A(k) = J_0(2\pi f_D k) \quad (2)$$

In this formula, $J_0$ designates the Bessel function of the first type of order 0 and $f_D$ designates the normalized Doppler frequency which is equal to the product of the carrier frequency (for example, 2 GHz) times the ratio of the speed of movement of the cellular mobile telephone to the speed of light.

It is therefore noted that each reference autocorrelation vector depends on the speed of movement of the cellular mobile telephone. Also, the reference autocorrelation vectors are precalculated and tabulated for various values of speed. (Step 33, FIG. 3). When the autocorrelation estimation data calculated in step 32 become statistically reliable, which is in general after one second, comparison means CMP perform (step 34) a comparison between the normalized autocorrelation vector R and the set of reference autocorrelation vectors stored in the memory MM.

More precisely, these means CMP will (step 35, FIG. 3) select from among the stored autocorrelation vectors the one which most resembles, for example, in the sense of a Euclidean distance, the normalized autocorrelation vector R. Speed estimation means MSV then estimate the speed (step 36) that is associated with the selected reference vectors.

The invention is not limited to the embodiment and mode of implementation just described, but embraces all variations thereof. Thus, within the framework of UMTS, a fading coefficient value is estimated per slot, with a slot lasting 0.667 ms. The maximum speed that may be estimated is therefore around 400 km/h. In such an application, this maximum value is amply sufficient. However, in other applications it is possible to increase this maximum speed by estimating more than one coefficient value per slot.

Moreover, as indicated above, the minimum observable speed depends on the number of values which will be used to calculate the autocorrelation function. With 30 values, this implies that the speed of movement of the mobile terminal is updated every 30 slots, i.e. every 20 ms. Moreover, given that the speed of movement of the mobile terminal changes rather slowly over time (compared with 20 ms), it is possible to provide a sliding average of these measurements over some fifty measurements, for example, thereby strengthening the reliability of the measurement.

The number of reference vectors stored depends on the application. Thus, when the primary requirement is to differentiate a fast mobile terminal from a slow mobile terminal, it is necessary to store fewer reference autocorrelation vectors than in the case where there is a requirement for greater fineness in the estimation of the speed of movement.

That which is claimed is:

1. A process for estimating a speed of movement of a mobile terminal operating in a wireless communication system and communicating with a base station via a transmission channel, the process comprising:

estimating fading of the transmission channel;

performing an autocorrelation on the fading for providing a first autocorrelation result, the autocorrelation being performed over a duration corresponding to a minimum speed of movement of the mobile terminal that is to be estimated, the autocorrelation being a normalized autocorrelation of at least one fading coefficient, with the first autocorrelation result being a vector having a chosen length;

calculating a plurality of reference autocorrelation results for a plurality of predetermined values of speed of movement of the mobile terminal, the calculating being based upon a predetermined autocorrelation function performed on the fading, wherein the plurality of reference autocorrelation results are also vectors having the same length resulting from a normalized autocorrelation of the at least one fading coefficient using the known autocorrelation function;

comparing the first autocorrelation result to the plurality of reference autocorrelation results; and estimating the speed of movement of the mobile terminal based upon the comparing.

2. A process according to claim 1, wherein the autocorrelation comprises a Bessel function of the first type and of order zero.

3. A process according to claim 1, wherein the mobile terminal and the wireless communication system operate in accordance with the Universal Mobile Telecommunications System (UMTS) standard.

4. A process according to claim 1, wherein the mobile terminal comprises a cellular telephone.

5. A process according to claim 1, further comprising storing the calculated plurality of reference autocorrelation results in a memory.

6. A process for estimating a speed of movement of a cellular telephone comprising:

estimating fading of a transmission channel;

performing an autocorrelation on the fading for providing a first autocorrelation result, the autocorrelation being performed over a duration corresponding to a minimum speed of movement of the cellular telephone that is to be estimated, the autocorrelation is a normalized autocorrelation of at least one fading coefficient, with the first autocorrelation result being a vector having a chosen length;

calculating a plurality of reference autocorrelation results for a plurality of predetermined values of speed of movement of the cellular telephone, the plurality of reference autocorrelation results are calculated based upon a predetermined autocorrelation function performed on the fading, and wherein the plurality of reference autocorrelation results are also vectors having the same length resulting from a normalized autocorrelation of the at least one fading coefficient using the predetermined autocorrelation function;

comparing the first autocorrelation result to the plurality of reference autocorrelation results; and estimating the speed of movement of the cellular telephone based upon the comparing.

7. A process according to claim 6, wherein the autocorrelation comprises a Bessel function of the first type and of order zero.

8. A process according to claim 6, wherein the mobile terminal and the wireless communication system operate in accordance with the Universal Mobile Telecommunications System (UMTS) standard.

9. A process according to claim 6, wherein the mobile terminal comprises a cellular telephone.

10. A process according to claim 6, further comprising storing the calculated plurality of reference autocorrelation results in a memory.

11. A device for estimating a speed of movement of a mobile terminal operating in a wireless communication system and communicating with a base station via a transmission channel, said device comprising:

channel estimation means for estimating fading of the transmission channel;

first autocorrelation means for performing an autocorrelation of the fading for obtaining a first autocorrelation result, the first autocorrelation means performing a normalized autocorrelation of at least one fading coefficient with the first autocorrelation result being a vector having a chosen length;

a memory for storing a plurality of precalculated reference autocorrelation results for a plurality of predetermined values of speed of movement of the mobile terminal, the plurality of precalculated reference autocorrelation results being calculated based upon a predetermined autocorrelation function performed on the fading, the plurality of precalculated reference autocorrelation results are also vectors having the same length resulting from a normalized autocorrelation of the at least one fading coefficient using the predetermined autocorrelation function;

comparison means for comparing the first autocorrelation result to the plurality of precalculated reference autocorrelation results; and speed estimation means for estimating the speed of movement of the mobile terminal based upon the comparing.

12. A device according to claim 11, wherein the autocorrelation comprises a Bessel function of the first type and of order zero.

13. A device according to claim 11, wherein the mobile terminal comprises a cellular telephone.

14. A device according to claim 11, wherein the mobile terminal and the wireless communication system operate in accordance with the Universal Mobile Telecommunications System (UMTS).

15. A device according to claim 11, wherein the device is included within the mobile terminal.

16. A mobile terminal comprising:

an analog stage; and a digital stage connected to said analog stage for estimating a speed of movement of the cellular telephone by estimating fading of a transmission channel, performing an autocorrelation of the fading for obtaining a first autocorrelation result, the autocorrelation performing a normalized autocorrelation of at least one fading coefficient with the first autocorrelation result being a vector having a chosen length, comparing the first autocorrelation result to a plurality of precalculated reference autocorrelation results, the plurality of precalculated reference autocorrelation results being calculated based upon a predetermined autocorrelation function performed on the fading, the plurality of precalculated reference autocorrelation results are also vectors having the same length resulting from a normalized autocorrelation of the at least one fading coefficient using the predetermined autocorrelation function, and estimating the speed of movement of the mobile terminal based upon the comparing.

17. A mobile terminal according to claim 16, wherein said digital stage comprises a memory for storing the plurality of precalculated reference autocorrelation results.

18. A mobile terminal according to claim 16, wherein the autocorrelation comprises a Bessel function of the first type and of order zero.

19. A mobile terminal according to claim 16, wherein the mobile terminal and the wireless communication system operate in accordance with the Universal Mobile Telecommunications System (UMTS).

20. A mobile terminal according to claim 16, further comprising an antenna connected to said analog stage.

21. A process for estimating a speed of movement of a mobile terminal operating in a Code Division Multiple Access (CDMA) type wireless communication system and communicating with a base station via a multipath transmission channel, the process comprising:

estimating fading for each path of the multipath transmission channel to obtain a plurality of fading coefficients;

combining values of the plurality of fading coefficients, and weighting them by respective signal-to-noise ratios;

performing an autocorrelation on the fading for providing a first autocorrelation result, the autocorrelation being performed over a duration corresponding to a minimum speed of movement of the mobile terminal that is to be estimated;

calculating a plurality of reference autocorrelation results for a plurality of predetermined values of speed of movement of the mobile terminal, the calculating being based upon a predetermined autocorrelation function performed on the fading;

comparing the first autocorrelation result to the plurality of reference autocorrelation results; and estimating the speed of movement of the mobile terminal based upon the comparing.

22. A process according to claim 21, wherein the mobile terminal comprises a cellular telephone.

23. A process according to claim 21, further comprising storing the calculated plurality of reference autocorrelation results in a memory.

* * * * *